N. D. LEVIN.
GEAR WHEEL.
APPLICATION FILED NOV. 21, 1916.

1,330,482.

Patented Feb. 10, 1920.

WITNESSES:
Harry C. Dean
Dudley T. Fisher

INVENTOR.
Nils D. Levin
BY
ATTORNEY.

UNITED STATES PATENT OFFICE.

NILS D. LEVIN, OF COLUMBUS, OHIO, ASSIGNOR TO THE JEFFREY MANUFACTURING COMPANY, OF COLUMBUS, OHIO, A CORPORATION OF OHIO.

GEAR-WHEEL.

1,330,482.

Specification of Letters Patent. Patented Feb. 10, 1920.

Application filed November 21, 1916. Serial No. 132,684.

*To all whom it may concern:*

Be it known that I, NILS D. LEVIN, a citizen of the United States, residing at Columbus, in the county of Franklin and the State of Ohio, have invented certain new and useful Improvements in Gear-Wheels, of which the following is a specification, reference being had therein to the accompanying drawing.

The present invention relates to certain new and useful improvements in gear wheels of the class adapted to use as transmission gears for traction cars, and the like, having detachable rim sections which may be renewed without the removal of the wheels from the car axle. Connection between the propelling motor and the traction wheels of electrically propelled traction cars, is commonly made by spur gears fixed to the car axle between the driving wheels. As these driving wheels are usually pressed on to the axles by hydraulic pressure their removal is a matter of considerable difficulty. Removal and replacement of a worn or broken gear of ordinary solid construction entails the disassembling of the truck of the car and the removal of one of the driving wheels from the axle. Many attempts have been made to apply split gears of various construction to the car axles, but owing to the vibrations and excessive strains of such service there has been experienced great difficulty in keeping such wheels tight on the axles.

To overcome this difficulty solid wheel centers have been fitted to the axles and to these are secured sectional gear rims which may be removed and replaced when worn or otherwise damaged. As heretofore constructed such gears have possessed inherent defects which it is the object of this invention to overcome. The especial object of my invention is to provide a gear having a readily renewable segmental rim of an improved construction by which perfect contact between the wheel body and rim sections is insured and possible relative movement of the parts is prevented.

The preferred embodiment of my invention is set forth in the following specification and is illustrated in the accompanying drawing of which—

Like numerals refer to similar parts in the several figures.

Figure 1:
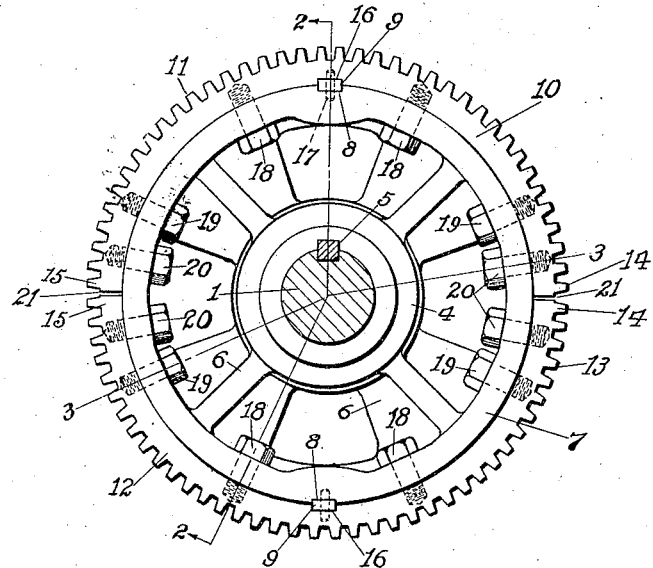
Figure 1 is a side elevation of a gear embodying my invention.
Figure 2:
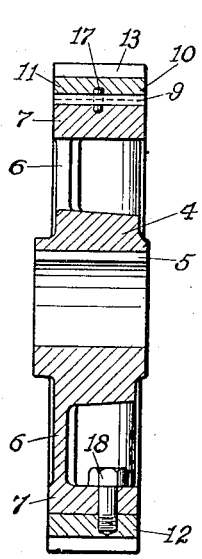
Fig. 2 is a section along the line 2—2 of Fig. 1.
Figure 3:
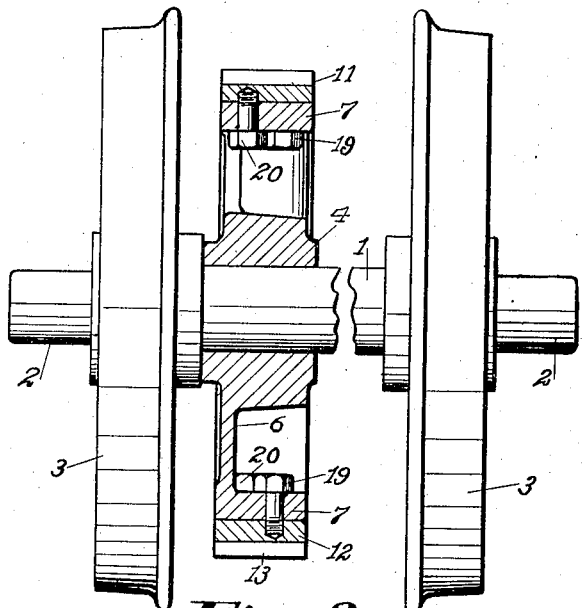
Fig. 3 is a section along the line 3—3 of Fig. 1, showing the relation of the gear to the car axle and traction wheels.

Referring to the drawing the numeral 1 indicates an axle having journals 2 adapted to support the journal boxes of a traction car or other similar vehicle, and having traction wheels 3 securely attached thereto. Mounted upon the axle 1 between the wheels 3 is a hub 4 which is secured against rotation relatively to the axle by the keys 5. Formed on the hub 4 are radially extending spokes 6 to the ends of which is attached a laterally projecting annular flange 7 concentric with the axle 1. The outer surface of the flange 7 is accurately finished and is provided at two diametrically opposite points, midway between spokes, with key ways 8 in which are fitted the keys 9. Attachable to the flange 7 is a supplemental rim 10 composed of two similar sections 11 and 12 forged from rolled steel bars and accurately finished to fit upon the periphery of the flange 7. Gear teeth 13 formed upon the outer surface of the sections 11 and 12, are adapted to mesh with the pinions by which power is transmitted to propel the car. Midway between the ends 14 and 15 of the sections 11 and 12 are keyways 16 adapted to engage the keys 9 to prevent rotation of the gear rim 10 relative to the wheel center. Dowel pins 17 extending through the keys 9 and into suitable apertures of the flange 7 and gear segments 11 and 12 prevent lateral movement of the parts relatively to each other. Attachment bolts 18, extend through apertures of the flange 7 adjacent the keys 9 on either side thereof and are threaded into the metal of the rim segments 11 and 12. These bolts draw the central parts of the segments into closed contact with the flange 7 and keys 9 but tend to spring the ends 14 and 15 of the segments away from the flange 7. Additional attachment bolts 19 and 20 are disposed adjacent the ends 14 and 15 respectively to draw them into contact with the flange 7, thereby securing perfect contact at all points of the periphery. These gear segments 11 and 12 are formed slightly shorter than semicircles so that there shall remain a small gap 21 between adjacent ends 14—14 and 15—15, thus preventing the possible interference of the end of one section with the perfect contact of the other section upon the rim of the wheel.

When it is desired to attach a gear rim to such a wheel the axle 1 will be rotated to bring one of the keys 9 to the top of the wheel. A segment, as for example the segment 11 will then be placed so that the keyway 16 will register with the key 9 and the bolts 18 inserted and drawn down tight. This will produce a perfect contact of the middle part of the segment 11 with the flange 7 and key 9, but will tend to spread the ends 14 and 15 apart. The bolts 19 and 20 will then be inserted and drawn tight insuring a perfect fit of the entire rim section 11 with the flange 7. The axle will then be turned to bring the opposite key to the top of the wheel and segment 12 placed in the same manner. The gaps 21 between the segments 11 and 12 insure the free movement of the ends 14 and 15 under the clamping action of the bolts 19 and 20. By the arrangements of the parts above described I have provided a durable and economical transmission gear, capable of being so secured to the car axle that the jars and strains of heavy service will not cause it to work loose, the operative parts of which can be renewed when worn or damaged without the removal of the wheels from the axle.

What I claim is—

1. In a gear of the class described, the combination with a flanged wheel center, of a gear rim composed of two similar segments with their adjacent ends spaced apart, and inwardly drawing bolts for securing the rim to the wheel center.

2. In a gear of the class described, the combination with a flanged wheel center, of a gear rim composed of two similar segments with their adjacent ends spaced apart, keys positioned centrally of the segments, and symmetrically disposed inwardly drawing bolts passing through the flange of the center and engaging with the gear segments to secure them to said center.

3. In a gear of the class described, the combination with a wheel center, of a rim composed of two similar segments with their adjacent ends spaced apart, keys positioned centrally of the segments, symmetrically disposed inwardly drawing bolts adjacent the keys, and other symmetrically disposed inwardly drawing bolts adjacent the ends of the segments to secure the segments to the wheel center.

4. In a gear of the class described, the combination with a cylindrical wheel center, of a rim composed of segments the added length of which is less than a complete circle, said segments having an inner surface approximately conforming to the curvature of the outer surface of the wheel center, means to definitely position each segment circumferentially upon the wheel center to avoid contact between the ends of adjacent segments, and releasable means to force the inner surface of the rim segments into perfect contact with the outer surface of the wheel center and to retain them in said contact.

5. In a gear of the class described, the combination with a cylindrical wheel center, of a rim composed of two similar segments the added length of which is less than a complete circle, said segments having an inner surface approximately conforming to the curvature of the external surface of the wheel center, means to definitely position each segment circumferentially upon the wheel center to avoid contact between the ends of adjacent segments, and releasable means to force the inner surface of the segments into perfect contact with the outer surface of the wheel center and to retain them in such contact.

6. In a gear of the class described, the combination with a cylindrical wheel center, of a rim composed of two similar segments the added length of which is less than a complete circle, said segments having an inner surface approximately conforming to the curvature of the external surface of the wheel center, and releasable means to force the inner surface of the segments into perfect contact with the outer surface of the wheel center and to retain them in such contact.

7. In a gear of the class described, the combination with a cylindrical wheel center, of a rim composed of two similar segments the added length of which is less than a complete circle, said segments having an inner surface approximately conforming to the curvature of the external surface of the wheel center, and releasable means to first force the middle portion of each rim segment and afterward the end portion of said segments into perfect contact with the wheel center, and to retain said parts in such contact.

In testimony whereof I affix my signature, in the presence of two witnesses.

NILS D. LEVIN.

Witnesses:
 DUDLEY T. FISHER,
 HARRY C. DEAN.